T. T. ALKIN.
DENTAL HANDPIECE.
APPLICATION FILED APR. 13, 1910.
1,001,916.
Patented Aug. 29, 1911.
2 SHEETS—SHEET 2.
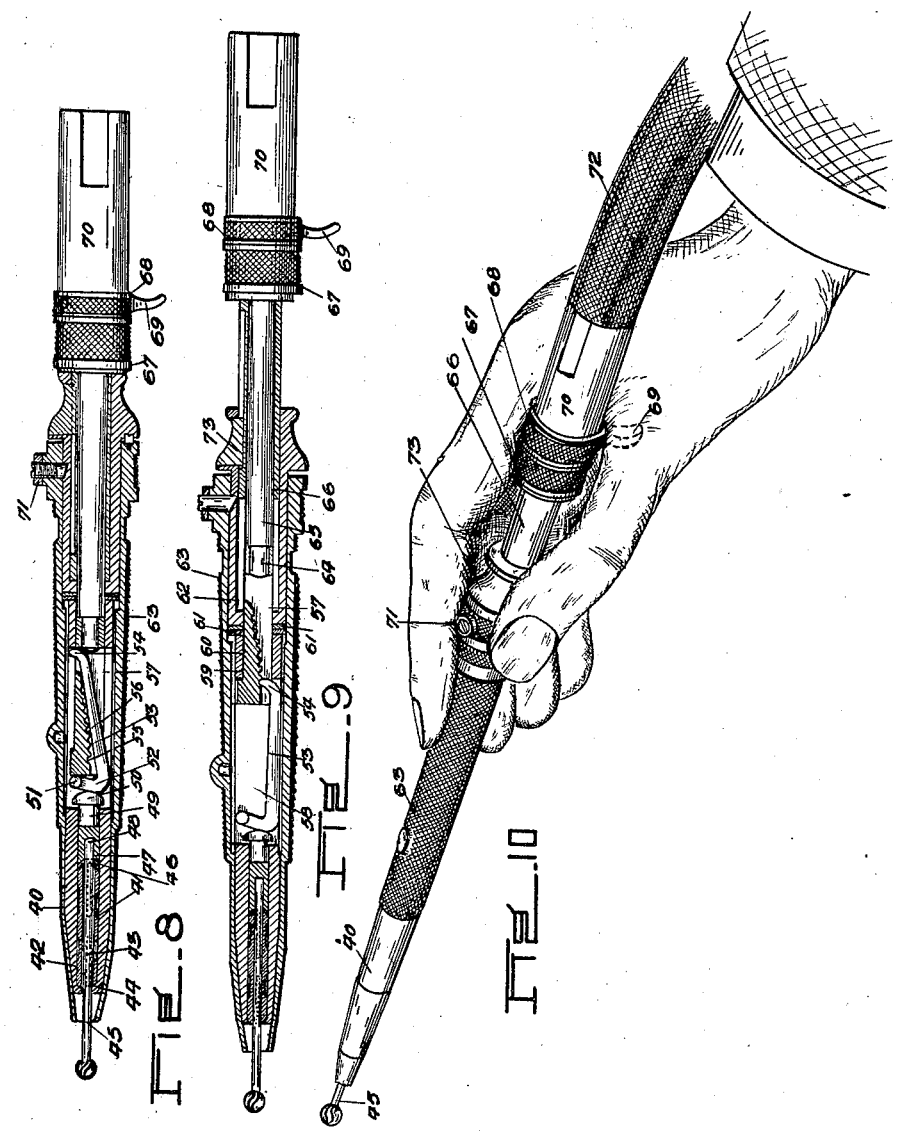
WITNESSES
W. P. Burk
John G. Percival
INVENTOR
Thomas Turner Alkin
BY
ATTY.

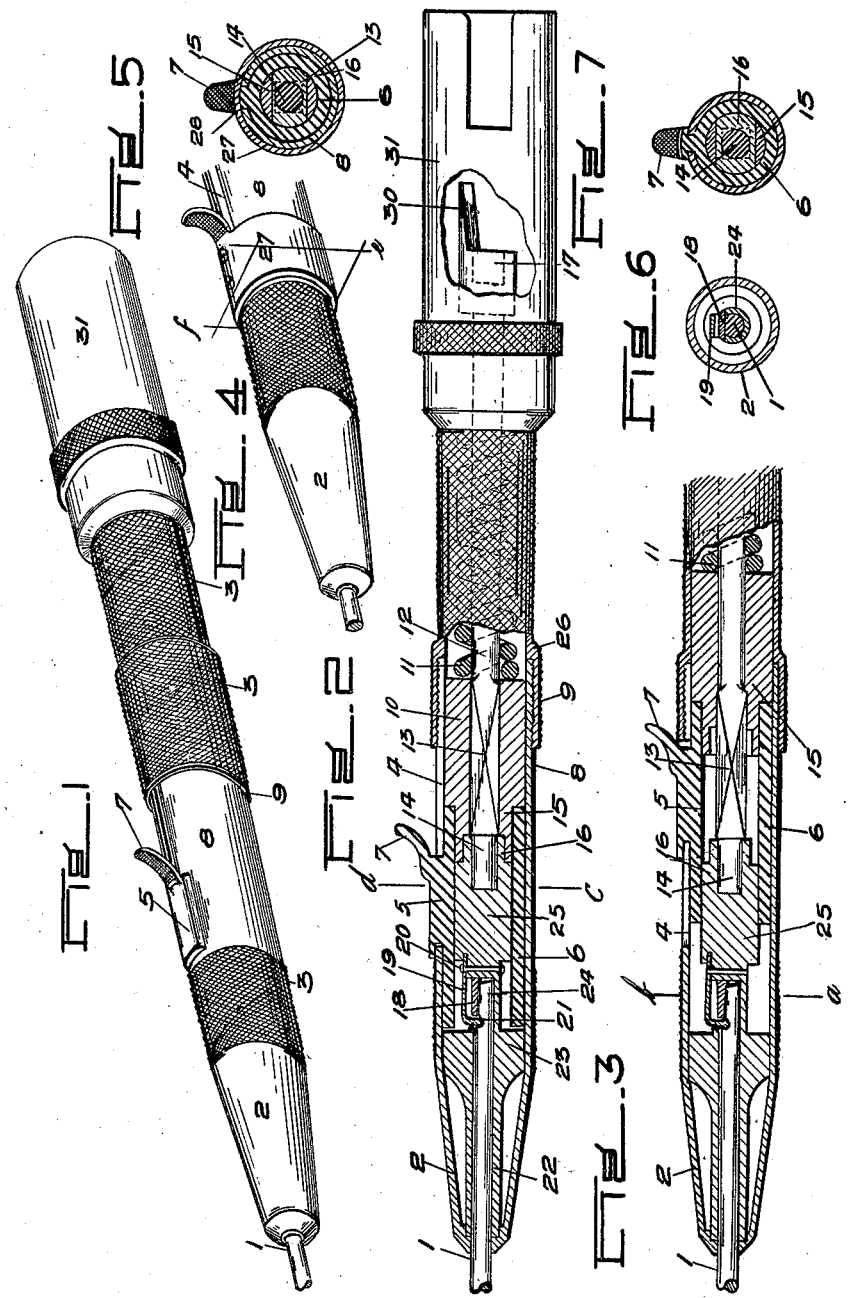

UNITED STATES PATENT OFFICE.

THOMAS TURNER ALKIN, OF GOULBURN, NEW SOUTH WALES, AUSTRALIA.

DENTAL HANDPIECE.

1,001,916. Specification of Letters Patent. Patented Aug. 29, 1911.

Application filed April 13, 1910. Serial No. 555,275.

*To all whom it may concern:*

Be it known that I, THOMAS TURNER ALKIN, a subject of the King of Great Britain and Ireland, residing at Goulburn, in the State of New South Wales, Australia, have invented certain new and useful Improvements in Dental Handpieces; and I do hereby declare the following to be a full, clear, and exact description of the invention, such as will enable others skilled in the art to which it appertains to make and use the same.

My invention relates to hand pieces which are used to carry dental drills, burs, disks and other dental tools at the head of a flexible shaft which is driven by a water motor, electric motor, or pedal engine.

The object of my present invention is to provide means whereby the operator may instantly connect and disconnect the tool in the hand piece to or from the driving spindle of said handpiece, which spindle is connected with the flexible shaft and may be allowed to remain in constant rotation during the whole period of a dental operation.

In a dental handpiece according to my invention, a light tool holder is carried in the fore end of the hand piece so as to be rotatable therein. The handpiece is connected at the rear end through a bayonet catch, dog clutch, or other suitable connection with the end of the flexible shaft which conveys motion to it from a water motor or other source of power. A clutch operated by a finger piece is provided to close and open a connection between the shaft and the tool holder. I illustrate in the annexed drawings forms of clutch mechanism for this purpose which have proved effective in practice.

Figures 1 to 7 relate to a handpiece containing in the body thereof a dog clutch operated by a finger control for connecting and disconnecting the base of the tool holder to and from the spindle, and Figs. 8 to 10 relate to an attachment to a handpiece of the known "slip joint" type whereby the operator is enabled by a contractive movement of the hand to release the grip of the tool holder upon the tool. In the first named type the clutch is closed or opened at will by a slight finger movement moving the trigger forward or rearward respectively. In the second type the tool is freed by a contractive movement of the hand, whereby the fork of the thumb is caused to press upon a trigger and thereby push inward the clutch sleeve; but in this case the parts can only be reclutched so as to reëngage the tool holder upon the tool by drawing back the clutch sleeve, which action cannot be performed with facility without the use of the operator's two hands.

Fig. 1 is a perspective view of a handpiece according to my invention; Fig. 2 a view partly in longitudinal section and partly in elevation showing the clutch locked to convey driving power to the tool; Fig. 3 similar fragmental view showing the clutch open and the driving connection between the spindle and the tool holder thus broken; Fig. 4 fragmental perspective view of the forward end of the handpiece, showing the finger piece in connection with a slide ring; Fig. 5 transverse section on lines $e-f$ Fig. 4; Fig. 6 transverse section on line $a-b$ Fig. 3; Fig. 7 transverse section on line $c-d$ Fig. 2. Fig. 8 longitudinal sectional elevation of a "slip joint" handpiece of usual construction having attached to it a finger piece attachment for moving the slip joint to open the tool holder and free the tool. In the position of parts shown in this figure the tool is free. Fig. 9 precisely similar view showing the position of the parts when the tool is locked in the holder. Fig. 10 perspective view illustrating the mode of holding the handpiece in use.

1 is a stem of the tool, 2 the nose of the handpiece, 3 knurled collars on the shell of the handpiece to provide efficient handgrip, 4 a slot in the part 8 of the shell of the handpiece. 6 collar slidable axially in the handpiece having the part 5 projecting through the slot 4 and a fingerpiece 7 formed on or attached to said part 5. The sleeve 6 may be moved backward. It is normally pressed forward as shown in Fig. 2 by means hereinafter described. The part 8 of the shell of the handpiece is screwed into the enlarged part 9 on the forward portion thereof.

10 is a clutch member slidable axially on the spindle 12 and rotatable therewith. The spindle is preferably formed with a squared portion 13 and the clutch member 10 is formed with a square aperture fitted to slide thereon. The part 13 may however be cylindrical and the sliding attachment may be a feather key. A compressible spring 11 surrounding the spindle is located in part 26 of the handpiece shell. This spring has its rear end bearing against a collar fixed on the spindle 12 and its forward end pressing against the rear end of the clutch member 10. The forward end 14 of the spindle 12 has a bearing in the rear end of the tool holder 25. Dog teeth 16 are formed on the forward end of the clutch member 10 and on the rearward end of the tool holder 25. These dog teeth form a positive clutch when engaged as shown in Fig. 2.

17 is a slip connection of ordinary type having an engaging tooth 30. The core of the flexible shaft by which rotary motion is conveyed to the handpiece is connected to this slip clutch 17 in any well known manner. The forward end of the tool holder 25 is formed as shown at 22 and 23 to take a bearing in the nose 2 of the handpiece. This forward part of the tool holder is tubular and adapted to receive the stem of the tool 1, the tangs of which are a known construction as shown.

18 is a hardened plate which engages the flat face of the tang and 19 is a nipping spring, the nose of which 21 sets into the notch in the tool tang to latch the tool in the holder.

20 is the pin by which the spring 19 is secured in the holder.

24 is the collar of the holder in which the tang of the tool is received.

When the finger piece is made as shown in Fig. 1 it is most conveniently controlled by the first finger of the operator's hand. If desired a ring 27 may be added to the finger piece to provide a readier grip for the operator's finger. When the ring finger piece is used it is attached to the sleeve 6 by pins 28 which pass through the slot 4. In this case the projection 5 which carries the finger piece 7 shown in Figs. 1, 2, 3 and 7 being omitted.

The mode of operation is as follows:—The tool 1 being set in the holder in the usual way, the handpiece is grasped so that one or other of the operator's fingers will be on the finger piece 7 or on some part of the ring 27. Motion being now conveyed to the shaft, the spindle 12 is rotated and rotary motion is conveyed thereby through the sleeve 10 and clutch dog 16 to the base of the tool holder 25, the tool being thereby set in motion. If during the course of an operation it is required to arrest suddenly the rotation of the tool 1, the operator by a movement of the finger slides back the sleeve 10, thereby disengaging the dog teeth 16 and so disconnecting the spindle 12 from the tool holder, the latter thereupon coming to rest immediately. Upon releasing the finger piece 7 or the ring 27, the spring 11 forces the sleeve 10 forward, thereby reëngaging the clutch teeth 16 and again putting the tool holder in motion.

Referring to Figs. 8 to 10 which illustrate a known form of handpiece to which the invention is applied, 40 is the forward end of the shell which carries within it a bearing sleeve 42 which is contracted conically at its forward end 44. 45 is the stem of a tool which is inserted in the tool holder 41. The tool holder is formed with conical ends and it is split at either end as shown at 43. Its forward end sets into the conical neck 44 of the sleeve 42. Its rear end sets in the conical cup 46 of the wedge plug 47. The butt end of the tool stem 48 sets freely into a hole in this wedge plug 47. The plunger 49 with button head 50 acts on the rear end of the wedge plug 47. When this plunger 49 is pressed forward, the wedge plug compresses 47 the tool holder 41 between the conical cups 44 and 46 thereby causing it to close on the stem of the tool 45, when the tool rotates with the sleeve 42. The rear part of the sleeve 42 is slotted out as shown at 58. In this slot a knuckle lever 53 is carried on a pin 51. The knuckle 52 of this lever acts against the button head 50 when the point 54 of the lever is moved from the position shown in Fig. 8 toward that shown in Fig. 9. This movement is effected by drawing the cam 56 rearward in relation to said lever. This cam is formed with corrugations on its inside face which engage the beak 54 on the end of the lever 53 sufficiently to prevent accidental slip. The cam 56 has slotted sides as shown at 57. Its base is tubular and attached to the end 64 of the spindle 65, the rear end of said spindle being fitted with a flexible shaft connection similar to 17 shown in Fig. 2. The sleeve 70 is formed with a bearing tube 66 carrying the spindle 65. This bearing tube is slidable axially through the rear end 73 of the handpiece. When the sleeve 70 is drawn backward as shown in Fig. 9 the lever 53 is thrown so as to force its knuckle 52 against the button 50 thereby compressing the tool holder 43 upon the tool stem and causing it to take a driving grip thereon. When the sleeve 70 is pressed home as shown in Fig. 8, the knuckle lever 53 is permitted to retire under the backward pressure of the expanding tool holder 43, and when in that position the tool holder being no longer compressed, the tool stem 45 is freed and the tool will not be turned although the spindle 65 continues in rotation. 68 is a collar pinned to the sleeve 70. 72 is the flexible shaft. The finger piece 69 is formed integral with or is attached to this collar. The position of the finger piece permits of it being conveniently held under the fork of the thumb of the operator as shown in Fig. 10.

The mode of operation is as follows:—The handpiece being held as shown in Fig. 10, and the sleeve 70 drawn backward so as to engage the tool holder 43 upon the tool stem 45, the operator proceeds with his work. If the tool should seize, or if it should be necessary for any other reason to disconnect the tool so as to stop its rotation immediately, the operator by a contractive movement of the hand by which the fork of the thumb is pressed against the finger piece 69, forces the sleeve 70 forward in relation to the body of the handpiece, so as to bring it into the position shown in Fig. 8, whereby the grip of the tool holder upon the tool stem is liberated.

What I claim as my invention and desire to secure by Letters Patent is:—

1. In a dental handpiece, the combination with a shell slotted in the fore part, a tubular collar slidable within the case and having upon it a finger piece constructed to project through said slot whereby rotation of said tubular piece is prevented and means afforded for retracting the same, of a tool holder within said shell having a cylindrical butt rotatable within the tubular collar, a cylindrical clutch piece bearing against said tubular collar and rotatable within the shell, a driving shaft, said clutch rotating with said shaft and adapted to slide in the direction of the length thereof, a spring rearward of said clutch piece and normally urging the same into engagement with said butt, and co-acting engaging portions on the tool holder butt and the clutch piece.

2. In a dental handpiece, the combination with a cylindrical shell slotted longitudinally near its fore end, of a tool holder rotatably mounted therein, a driving shaft, said holder having a cylindrical butt end containing a central bearing for the fore end of the driving shaft, a cylindrical clutch rotatable in said shell and slidable longitudinally on the shaft and engageable when advanced with the butt of the tool holder, a longitudinally slidable collar forming a bushing for the tool holder butt and an abutment and bearing for the face end of the clutch, an actuating spring rearward of said clutch, and a finger piece integral with said collar and projecting through the slot of the case.

In testimony whereof, I have affixed my signature, in presence of two witnesses.

THOMAS TURNER ALKIN.

Witnesses:
N. RILEY,
W. J. DAVIS.

---

Copies of this patent may be obtained for five cents each, by addressing the "Commissioner of Patents, Washington, D. C."